May 2, 1967  J. H. WILSON  3,316,783
PIPE TONGS
Filed Feb. 19, 1965  9 Sheets-Sheet 5

JOHN HART WILSON
INVENTOR.

BY
Wayland D. Keith
HIS AGENT

United States Patent Office 3,316,783
Patented May 2, 1967

3,316,783
PIPE TONGS
John Hart Wilson, % Wilson Manufacturing Co.,
P.O. Box 1031, Wichita Falls, Tex. 76307
Filed Feb. 19, 1965, Ser. No. 434,745
15 Claims. (Cl. 81—54)

This invention relates to pipe tongs to be used for gripping pipe to enable pipe to be screwed together or unscrewed, and more particularly to power actuated pipe tongs which may be remotely controlled so the individual operating the tongs is relieved of opening and closing the tongs, of engaging the tongs on the pipe and of removing the tongs therefrom, as well as of moving the lever of the tongs arcuately about the axis of the pipe when the tongs are engaged on the pipe.

Various tongs have been provided heretofore which are operated both manually and by power, however, for the most part, these tongs had to be manually controlled to engage the pipe and manually swung out of engagement when the pipe was sufficiently tightened.

The present tongs are so constructed that a single operator may operate both the tongs to enable "automatic" or mechanical engagement thereof with the pipe, from a non-operating position to an operating position, and then, after the tongs are in position to engage the pipe, power is used to close the tongs in gripping relation around the pipe. Furthermore, the apparatus for handling the tongs is actuated by fluid power, which rotates the pipe in either direction as desired, while the back-up tong is maintained in engaged gripping relation with a complementary joint of pipe so as to enable the entire work to be performed by remote control, and without danger to the workmen, as has been the case heretofore, in most instances, in the use of power actuated tongs.

The present tongs are used primarily in combination with a derrick, mast or the like, however, they are subject to adaptation to any phase of screwing up or unscrewing pipe, merely by changing the mounting to accommodate the particular pipe screwing up or unscrewing job to be done. The present tong is primarily used with drill pipe in the drilling of oil wells, which pipe consists of threaded joints, to enable the coupling of lengths of pipe together in the form of a drill stem, which may extend several hundred or several thousand feet into the earth strata to perform the operation of drilling an oil well by the rotary drilling method. In performing this drilling operation, it is desirable to have all pipe joints tightened securely and accurately, but not tightened to such extent as to cause the threads to gall or to strip.

An object of this invention is to provide power actuated tongs which may be swung into place around axially aligned lengths of pipe to enable the making up or breaking out of the threaded joints connecting lengths of pipe in end-to-end relation.

Another object of this invention is to provide a power actuated tong in which all control operations may be performed from a remote station, to enable the tongs to be guided onto the pipe, so as to surround lengths of axially aligned pipe to screw the pipe together, or to unscrew the lengths of pipe without manual assistance from the operator.

Still another object of the invention is to provide a tonging system for operating a pair of tongs from a remote position.

Still another object of the invention is to provide a power actuated tong for gripping lengths of pipe to be screwed together, wherein a cam and lever, operated under fluid pressure, closes the jaws of the tongs around the pipe in gripping relation to give a mechanical advantage.

Still another object of the invention is to provide a side opening tong which may be moved onto or off of a pipe from a side thereof without the necessity of having to draw the pipe through the tong.

Still another object of the invention is to provide a suspension system for a pair of tongs, whereby they can be moved into or out of engagement with a pair of axially aligned lengths of pipe in the same path each time the tongs are positioned thereon, thereby making it unnecessary for manual guidance of the tongs into the correct position.

Still another object of the invention is to provide a power actuated tong which may be readily regulated to take care of worn pipe or pipe of different diameters.

Still a further object of the invention is to provide tong adjustment means to enable the attachment of the tongs to the pipe in such manner as to swing the tongs into place around axially aligned lengths of pipe in the same relation each time.

Still another object of the invention is to provide fluid power actuated cylinder means to rotate at least one of the tongs through an arcuate travel each time the fluid actuated cylinder plunger is reciprocated.

Still another object of the invention is to provide a fluid control system for controlling the thrust exerted by the respective fluid actuated cylinders so as to prevent crushing of the pipe or twisting the pipe in two.

Still a further object of the invention is to provide a tong mounting system to enable the tongs to be moved into engagement with a pair of axially aligned lengths of pipe and be moved out of engagement with the pipe and out of the work area when the screwing or unscrewing operation has been performed.

Yet another object of the invention is to provide means consisting of a hydraulic relief valve which can be set at a pressure so as to by-pass the hydraulic fluid at a predetermined pressure which will enable each screwthreaded coupling joint to be tightened to the same degree.

With these objects in view and others which will become manifest as the description proceeds, reference is to be had to the accompanying drawings in which like reference characters designate like parts in the several views thereof, in which.

With more detailed reference to the drawings, the form of the invention, as shown in FIGS. 1 through 14, discloses side opening tongs designated generally by the numerals 31 and 32, with the tong 32 being used as the gripping or back-up tong. The tong 31 is suspended from a mast or derrick 58 by a lug 30 having a support pin 34 thereon, which support pin journals one end of an arm 36 for arcuate movement therearound. The other end of arm 36 has a pin 38 therein to which a second arm 40 is pivoted. The arm 40 has a support bolt 42 secured thereto, which extends upward from tong 31 and is connected in secure relation to the tong to permit inward and outward swinging movement of tong 31 about pivot pin 44. The pivot pin 44 passes through clevis 46 on the plunger 48 of fluid cylinder 51. The fluid cylinder 51 is pivotally mounted on pivot 52 to compensate for arcuate movement as the plunger 48 moves inward and outward.

A second fluid actuated cylinder 54 is pivotally mounted on pin 56, which pin 56 is secured to mast or derrick 58. The other end of the fluid actuated cylinder 54 has a ram 59 extending outward therefrom and on which a clevis 60 is fitted, which clevis has a pin 62 therein. The pin 62 passes through an apertured lug on a side of tong 31, intermediate the length thereof, so upon directing fluid under pressure, into cylinder 54 through conduit 66, the open side of tong 31 will move into a position to engage pipe 70.

A third fluid actuated cylinder 74 is pivotally mounted on the handle portion 84 of the elongated body of tong 31 and has a plunger 76 extending outward therefrom on which cam means, such as a wedge-shaped cam 78 is mounted. The wedge shaped cam 78 extends outward toward movable jaw 80, which jaw is pivotally mounted on body 84 by pivot pin 82. The respective conduits 72 and 73 are connected to opposite ends of cylinder 71, so, upon direction of hydraulic fluid under pressure into conduit 72, the plunger 76 and cam 78 will be moved longitudinally of the body portion of tong 31, whereupon, the cam 78 will engage between a pair of rollers 94, which rollers are mounted, respectively, on the body of tong 31 and movable jaw 80, as will best be seen in FIGS. 3 and 8, which will cause jaw 80 of tong 31 to pivot about pin 82 to cause jaw 80 to move pipe engaging means, such as dies 86 and 88 thereof to bindingly engage with pipe 70. The jaw 80 and body 84 have removable jaw members 92 and 90, respectively, attached thereto by fastening means. The dies 86 and 88 are attachably fitted in jaw members 90 and 92, respectively, and may be removed therefrom or therewith, to be sharpened or replaced, as desired.

Each of the rollers 94 is journaled on the respective cam bolts 96, one passing transversely through handle 84 of tong 31 and the other passing transversely through the end of the lever portion of movable jaw 80, which is adjacent the cam 78, so the axis of each roller may be varied with respect to cam 78. An adjustment wrench 98 is fitted on the head 100 of one of the cam bolts 96 and may be turned to change the axis of eccentric cam shaft 102 thereon, with respect to the face of cam 78, which each roller 94 engages. When the eccentric cam shaft 102 is properly adjusted, a thumb screw 104 is used to secure the wrench 98 in place on handle 84, which will prevent rotation of cam bolt 96 until it is desirable to change the adjustment of the eccentric cam shaft 102. The pivoted jaw member 80 of the tong 31 has a bolt 96 therethrough, which is similar in construction to the above mentioned bolts 96, and the second roller 94 is mounted on a second bolt 96 and is journaled on an eccentric cam shaft 102 thereof, so, upon adjustment of second bolt 96 and eccentric cam shaft 102, the cam roller 94, on pivoted jaw 80, may be moved in relation to the face of cam 78, thereby enabling the cam 78 to engage to the desired depth between the flanged rollers 94.

Figure 2:
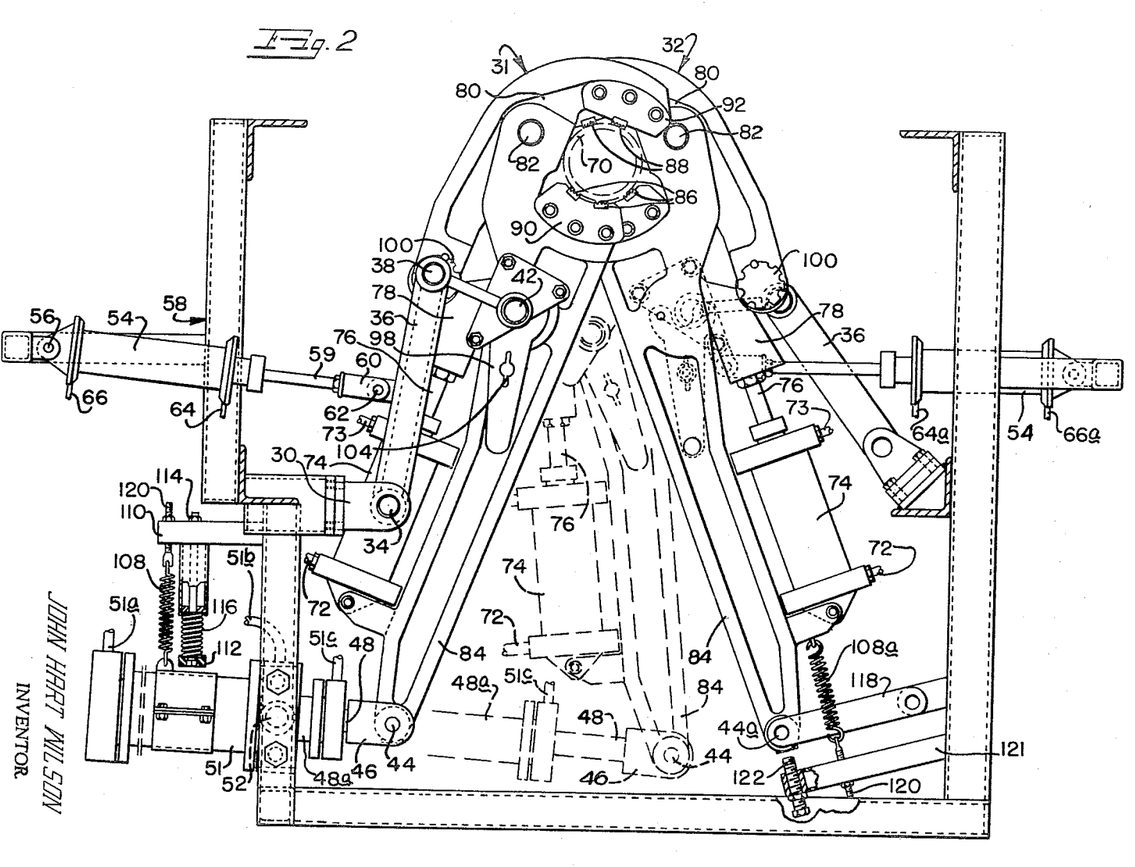
FIG. 2 is a view similar to FIG. 1, but showing the tongs in engaged position around lengths of axially aligned pipe and showing one of the tongs and power cylinder therefor in full outline, in one position, and in dashed outline in another position, to show the manner in which pipe is operated by the tongs.
Figure 3:
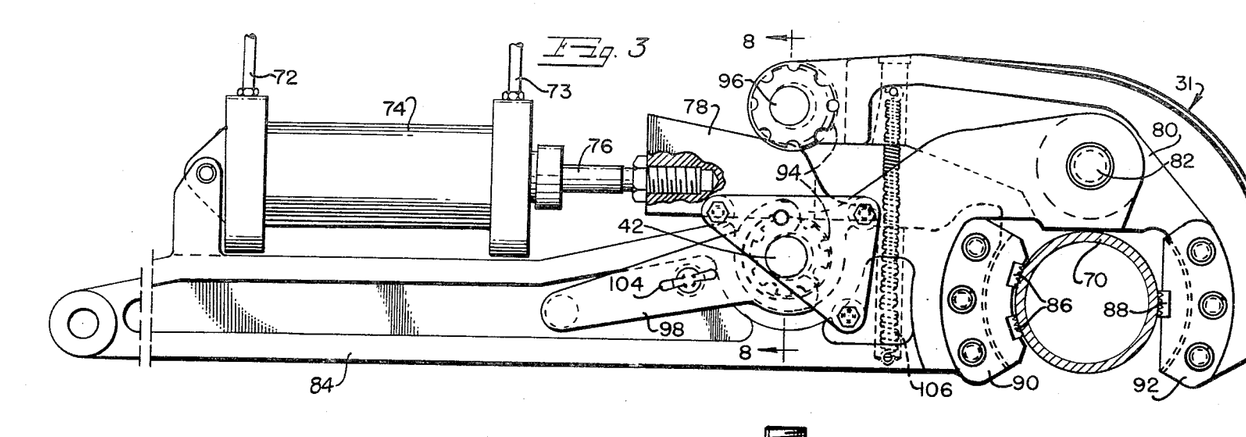
FIG. 3 is an enlarged top plan view of one of the tongs, showing the tongs engaged around a length of pipe, with parts broken away and with parts shown in section.
Figure 4:
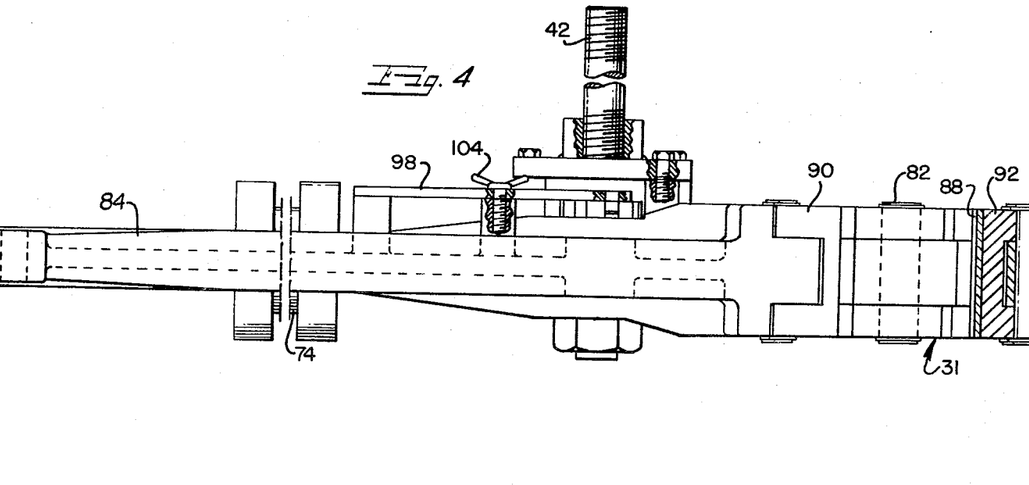
FIG. 4 is a side elevational view of the tong, with parts broken away, with parts shown in section, and with parts shortened to bring out the details of construction.
Figure 5:
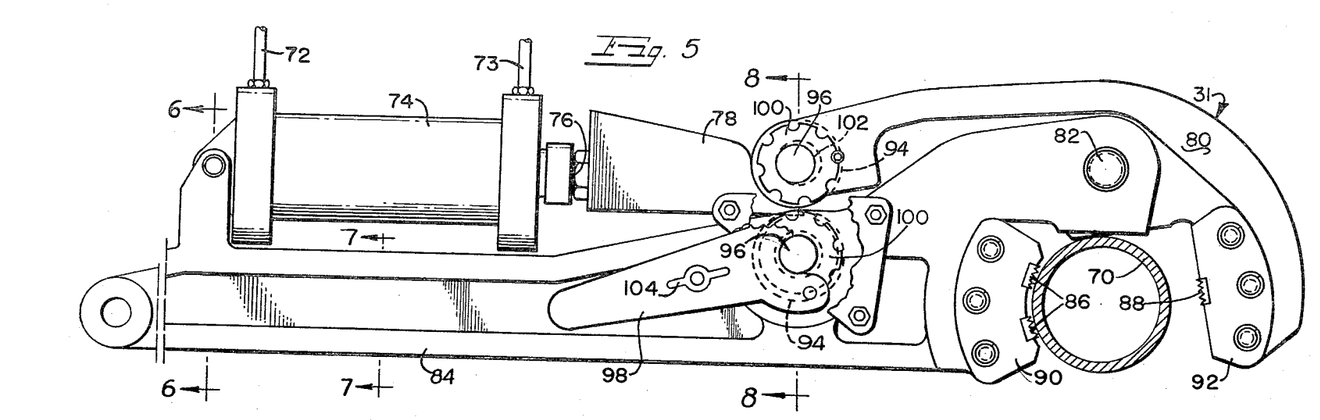
FIG. 5 is a view similar to FIG. 3, but showing the tongs in open position.
Figure 6:
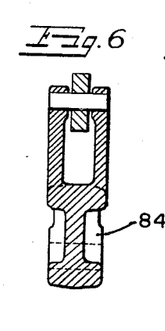
FIG. 6 is a sectional view taken on line 6—6 of FIG. 5, looking in the direction indicated by the arrows.
Figure 7:
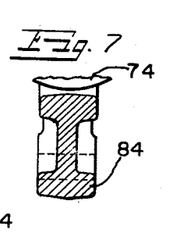
FIG. 7 is a typical sectional view of the handle, taken on line 7—7 of FIG. 5, looking in the direction indicated by the arrows.
Figure 8:
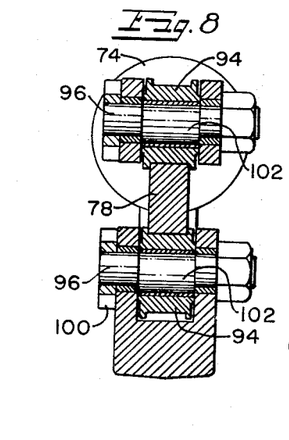
FIG. 8 is a sectional view taken on line 8—8 of FIG. 3, looking in the direction indicated by the arrows, and showing a cam wedged between rollers.
Figure 9:
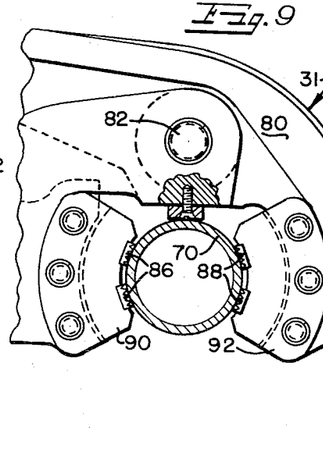
FIG. 9 is a fragmentary view of an end portion of the tong, similar to the tong shown in FIG. 3, but showing an adapter block therein to center pipe of smaller diameter, and showing tong dies mounted therein to accommodate pipe of smaller diameter.
Figure 10:
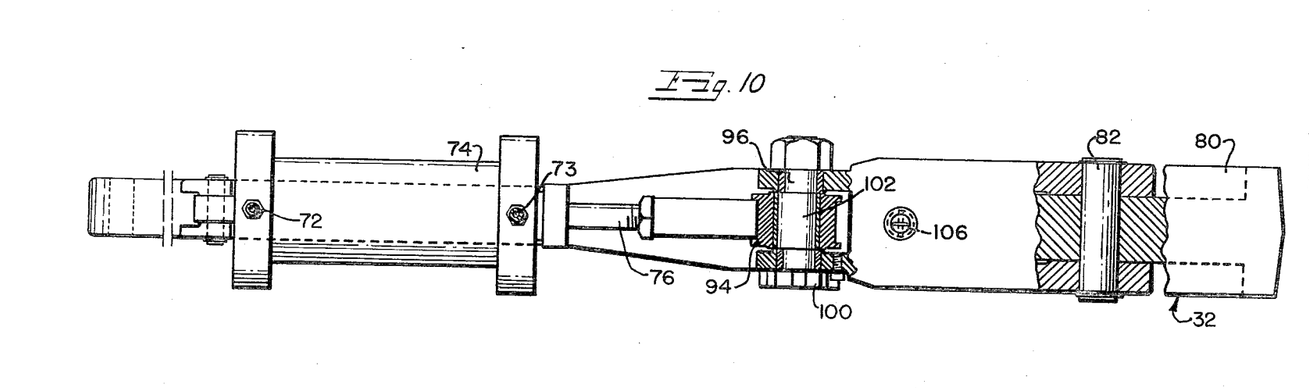
FIG. 10 is a side elevational view of the tong similar to that shown in FIG. 4, but showing the opposite side of the tong, and with portions of the tong being broken away and portions thereof being shown in section to bring out the details of construction.
Figure 11:
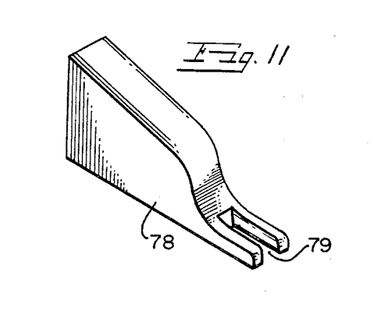
FIG. 11 is a perspective view of the wedge cam which performs the jaw closing operation.
Figure 12:
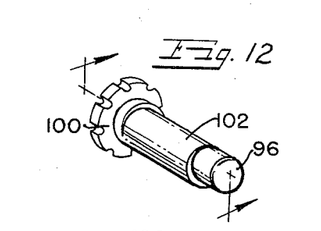
FIG. 12 is a perspective view of a cam shaft and cam adjusting head for adjusting the tong dies to worn pipe or to pipe of slightly different size.
Figure 13:
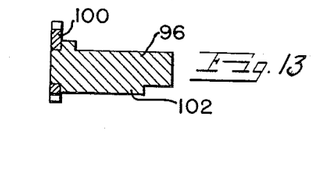
FIG. 13 is a longitudinal, sectional view through the cam shaft, as shown in FIG. 12.
Figure 14:
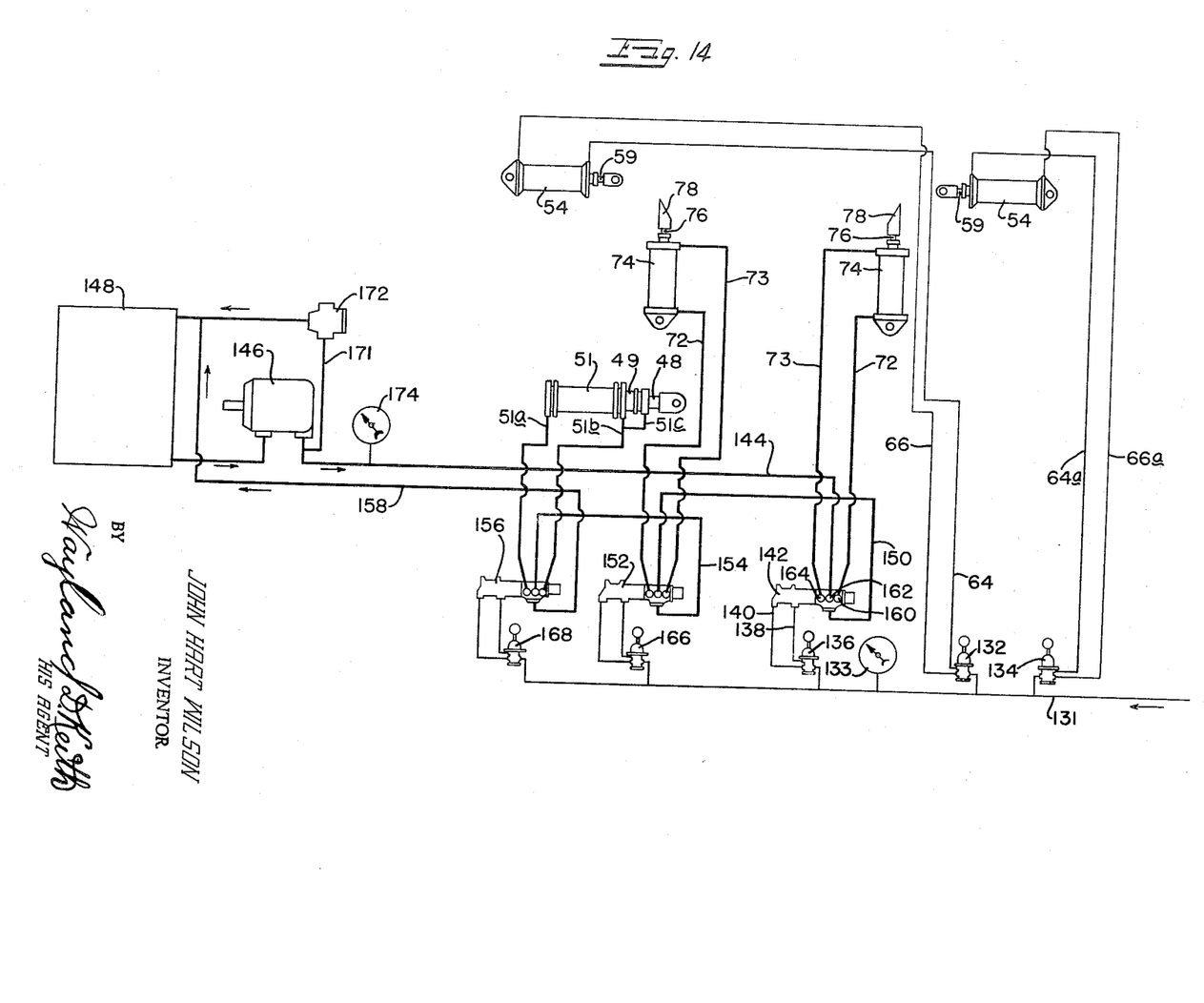
FIG. 14 is a diagrammatic view of the fluid pressure system and the fluid cylinders used to actuate the power actuated tongs.
Figure 15:
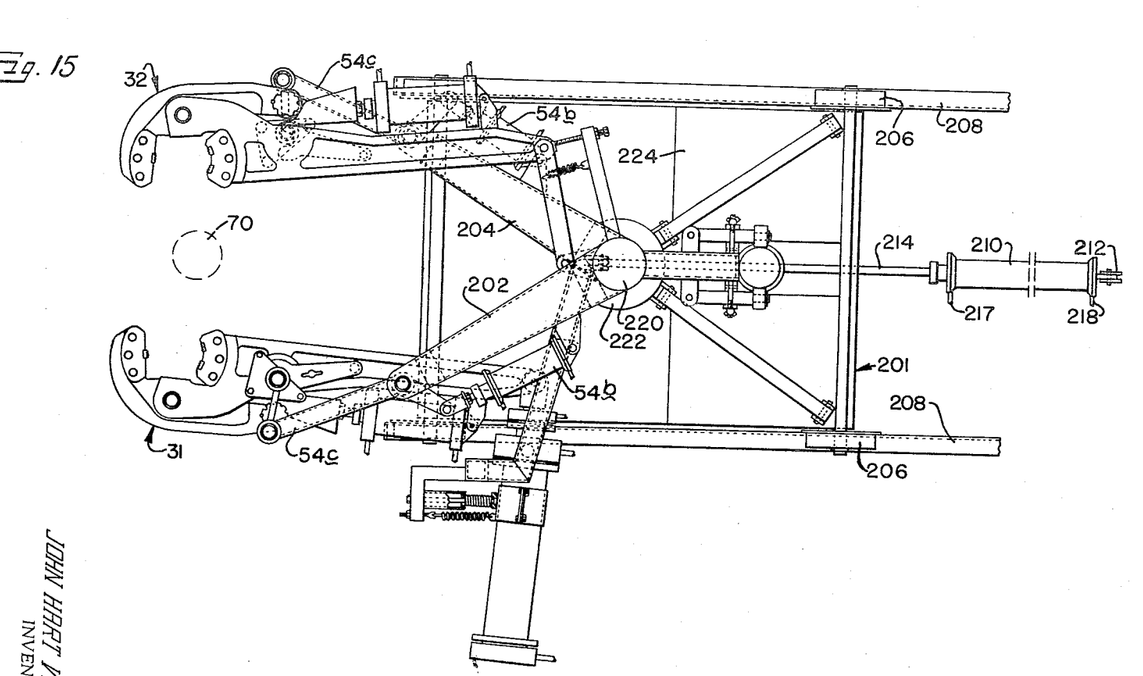
FIG. 15 is a top plan view of the tongs in open position, preparatory to engagement with axially aligned lengths of pipe, on which a screwing operation is to be performed, showing the power actuated tongs mounted on a mobile carriage to enable the tong unit to be moved into and out of engagement with the pipe to be operated upon, and to enable the removal of the entire mobile carriage and tong unit, when the action has been performed.
Figures 16, 17:
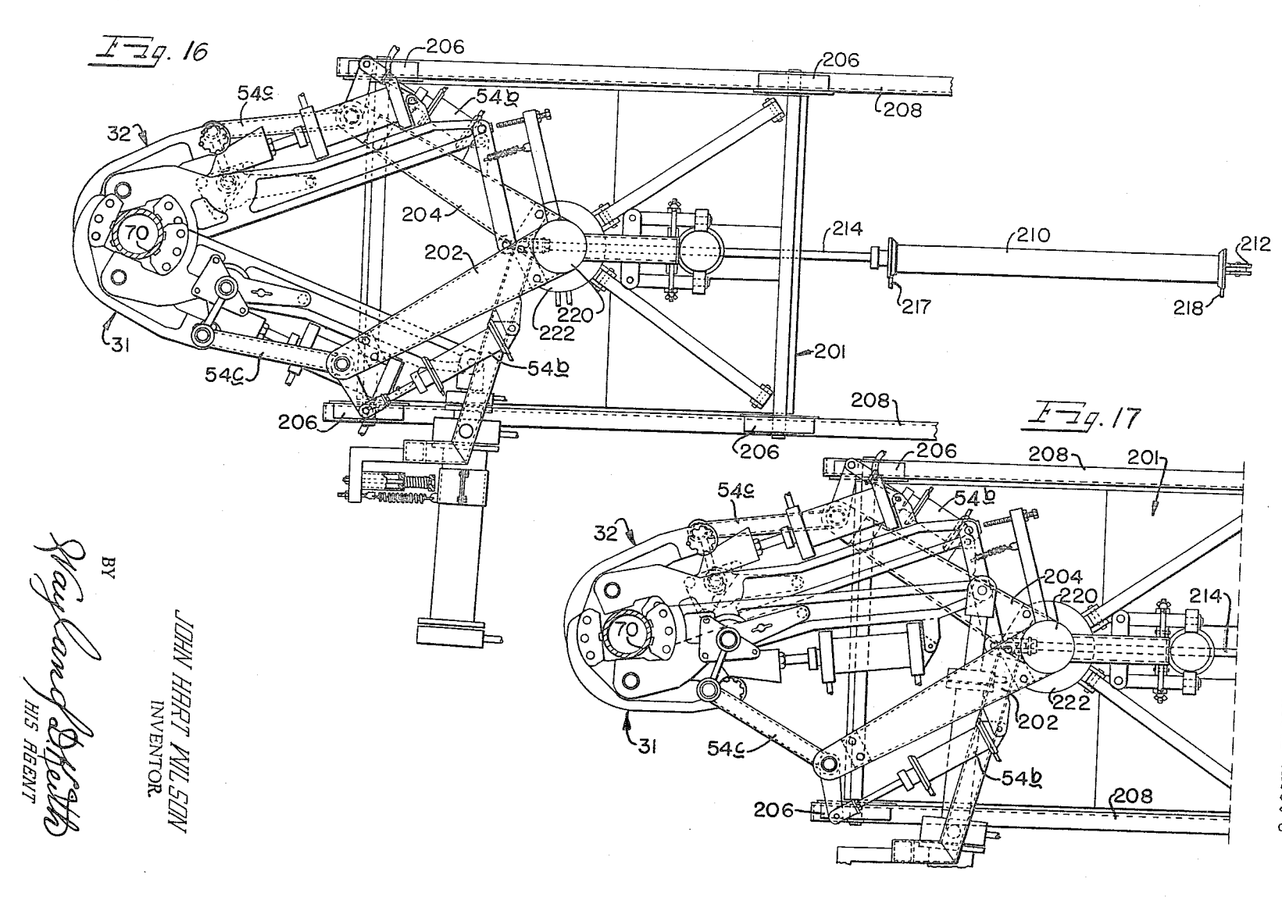
FIG. 16 is a top plan view, similar to FIG. 15, the tongs being shown in engaged relation preparatory to unscrewing movement by one of the power actuated tongs.
FIG. 17 is a view similar to FIG. 16, but showing only a fragmentary portion thereof and showing the power actuated tong moved through an arc to perform a screwing operation upon a pipe.
Figure 18:
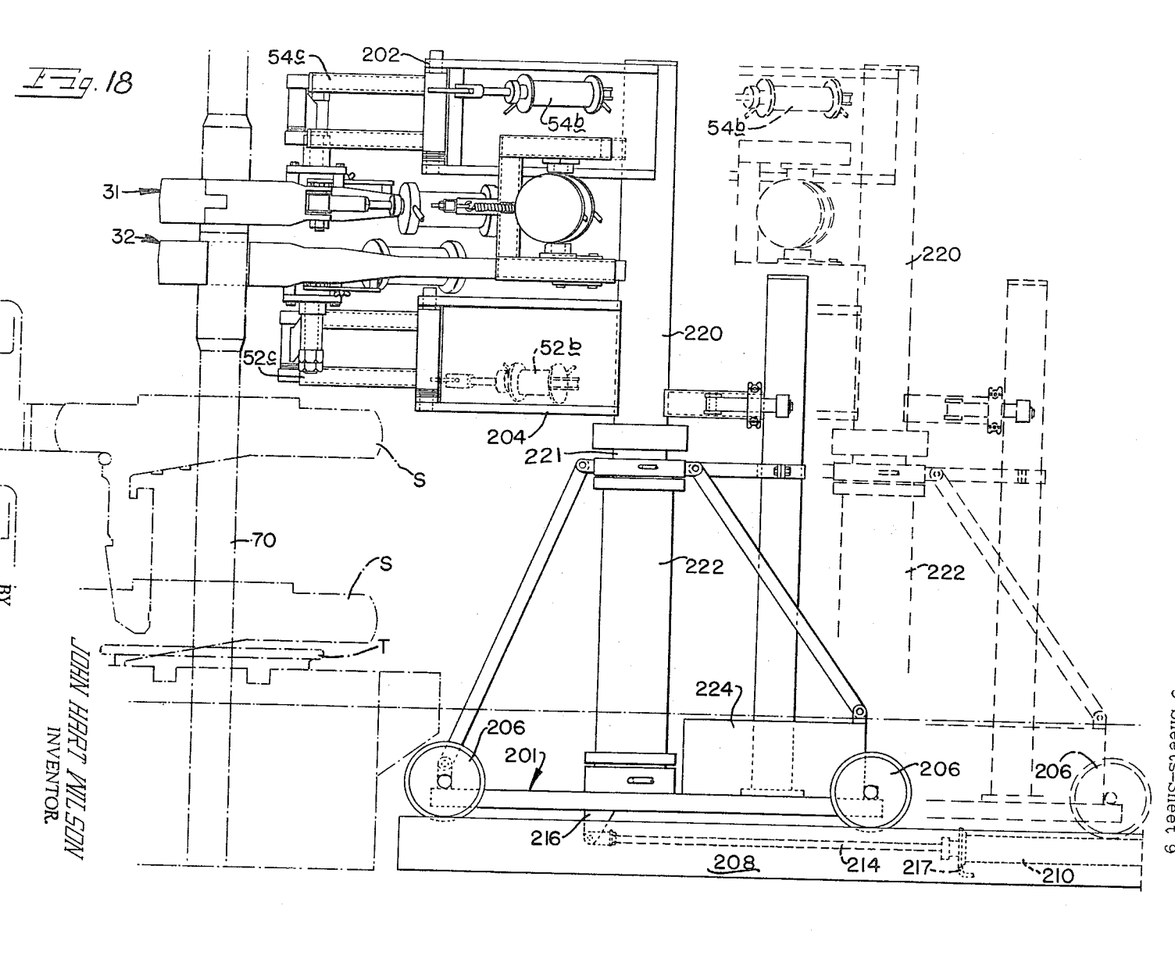
FIG. 18 is a side elevational view of the tong mounting carriage and tongs, as shown in FIGS. 15 through 17, showing the tongs and carriage in full outline, with the tongs being positioned around axially aligned lengths of pipe, with the pipe, the pipe supporting slips and the rotary table being shown in dot-dash outline, and with the retracted position of the carriage supporting the tongs, being shown in dashed outline.

The cam 78 is bifurcated at 79 so as to straddle a tension spring 106, which spring extends between handle 84 and pivoted jaw 80, and is anchored to the jaw and handle respectively, which spring urges these portions together, which, in turn, opens the side 68 of the tong 31 to admit pipe 70 into the open side 68 of the tong, as will best be seen in FIGS. 2 and 3.

Figure 1:
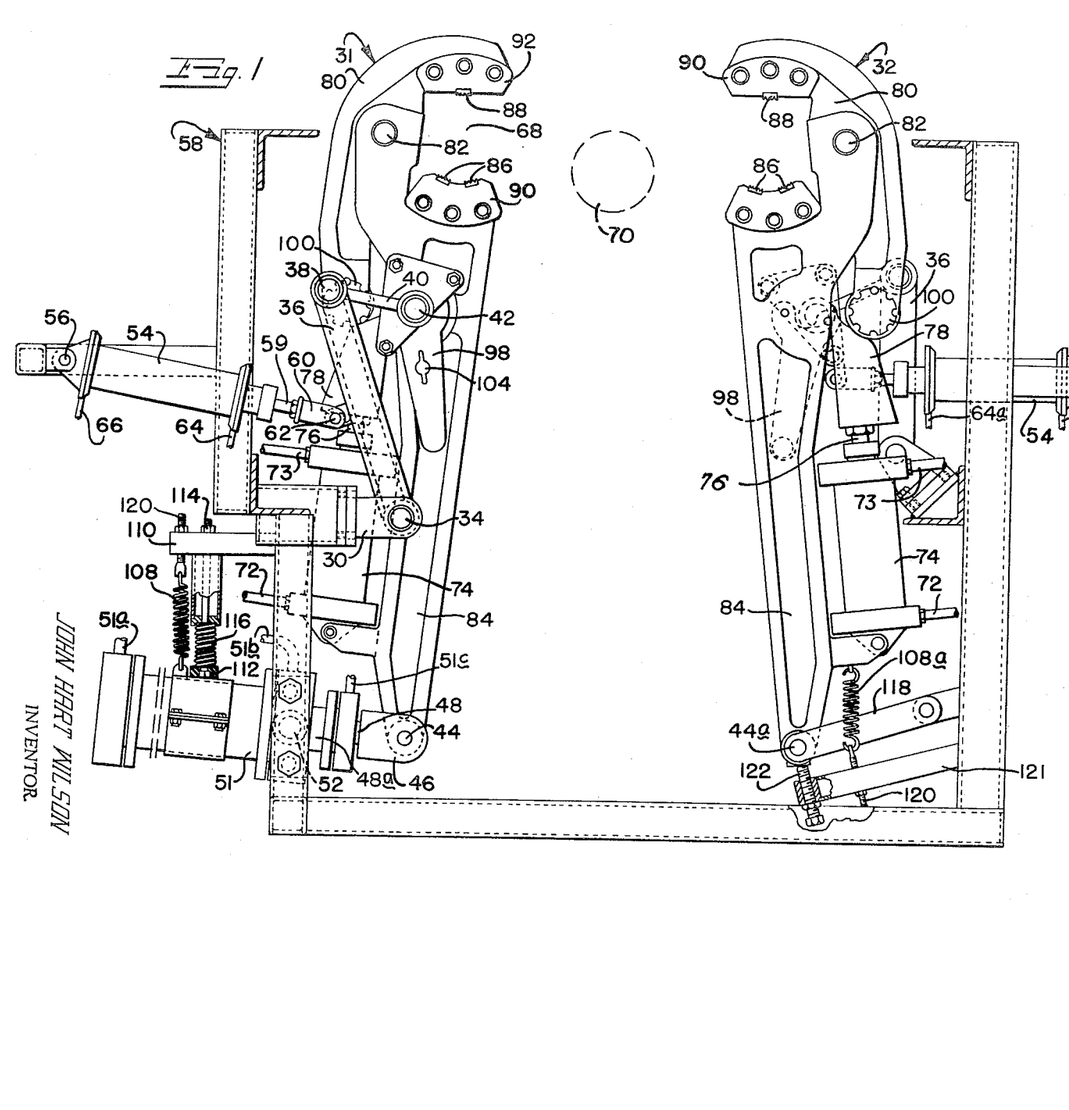
FIG. 1 is a horizontal sectional view through a derrick or mast, showing a pair of power actuated tongs supported therein, with the tongs shown to be in non-operating or retracted position, with parts being broken away and parts being shortened, and with other parts being shown in section to bring out the details of construction, the position of the lengths of pipe to be operated upon being shown in dashed outline.

The cylinder 51 has a tension spring 108 connected thereto and to an anchor 110 on mast 58, so as to draw the cylinder 51 against stop 112. The stop 112 is preferably an elastomer pad which is positioned on an anchor bolt 114, secured to the anchor 110, and has a spring 116 interposed between the anchor 110 and the elastomer pad 112 so as to minimize the shock, when the side of the cylinder 51 swings thereagainst. The bolt 114 is adjusted by compression spring 116, which will vary the longitudinal movement of tong 31 so as to enable the tong to pass onto pipe 70 from the position as shown in FIG. 1 to that shown in FIG. 2.

The tong 32 is identical in structure to tong 31, except this tong is supported from the bottom, and is in reversed position with respect to tong 31, however, all identical corresponding parts will carry identical numbers with tong 31. The tong 32 has an end of the handle 84 thereof connected to a pivot pin 44a, which pin passes through a link 118 and through the apertured end of handle 84. A tension spring 108a is connected to the tong handle 84 and to an adjustable eye bolt 120, which eye bolt passes through a support member 121 which is secured to mast 58. The spring 108a will urge the tong handle 84 endwise into abutting relation with a screw threaded bolt 122, which is screw threaded in support member 121, which will maintain the tong 32 in correct adjusted relation so as to swing laterally into position to engage pipe 70. The cylinders 54 of the respective tongs out screwthreaded joints of drill stem, pipe and the like, as defined in claim 3; wherein
(a) said plunger of each fluid actuated first cylinder has a cam on the distal end thereof,
(b) means on the lever portion of each said movable jaw for complementally engaging said respective cams when each plunger is in one position, and
(c) resilient means for pivotally moving each lever when the respective cams are out of engagement therewith.

6. A power actuated tong for making up and breaking out screwthreaded joints of drill stem, pipe and the like, as defined in claim 1; wherein
(a) the body of said tong is pivotally supported intermediate the length thereof; and
(b) linkage means is provided to support said tong for lateral movement within a plane.

7. A power acuated tong for making up and breaking out screwthreaded joints of drill stem, pipe and the like, as defined in claim 5; wherein
(a) said tong body has a roller journaled therein intermediate said fluid actuated cylinder and said movable jaw,
(b) a further roller is journaled near an end of said lever portion of said movable jaw so said rollers will lie in a plane substantially perpendicular to the axis of said body,
(c) a wedge-shaped cam mounted on the plunger of said first fluid cylinder and adapted to complementally engage between said rollers when said plunger is in one position.

8. A power actuated tong for making up and breaking out screwthreaded joints of drill stem, pipe and the like, as defined in claim 7; wherein
(a) said wedge-shaped cam has an abrupt rise for a portion of the length thereof, and
(b) said wedge-shaped cam has a relatively flat taper for another portion of the length thereof so as to quickly open and close the jaws of said tong initially, and to apply a gripping action to said movable jaw with a high degree of compression when said jaws are in closed position.

9. A tong for gripping pipe and the like, which tong comprises;
(a) an elongated body,
(b) a movable jaw pivotally mounted near one end of said elongated body,
    (1) a lever portion on said movable jaw,
(c) first pipe engaging means within said body near an end thereof,
    (1) said movable jaw and said body having an opening formed therebetween,
(d) a further pipe engaging means positioned on said movable jaw within said opening and being in opposed relation to said first pipe engaging means within said body,
(e) a fluid actuated cylinder mounted on one side of said body,
    (1) said lever portion of said movable jaw extending toward said cylinder,
(f) means interconnecting the plunger of said cylinder with said lever portion of said movable jaw in power actuated relation,
(g) a tong support member,
    (1) means pivotally mounting said body of said tong on said support member for lateral swinging movement thereof within a plane,
(h) the plunger of said fluid actuated cylinder having a wedge-shaped cam on the distal end thereof,
(i) means on said lever portion of said movable jaw for complementally engaging said cam when said plunger is in one position,
(j) resilient means for pivotally moving said lever when said cam is out of engagement therewith,
(k) said tong body having a roller journalled therein intermediate said fluid cylinder and said movable jaw,
(1) a further roller journaled near an end of said lever of said movable jaw so said rollers will lie in a plane substantially perpendicular to the longitudinal axis of said body,
    (1) said wedge-shaped cam being adapted to complementally engage between said rollers when said plunger is in one position,
(m) an eccentric shaft mounted on said elongated body,
    (1) said rollers each being mounted on said eccentric shaft,
    (2) means by which to adjust the eccentricity of said eccentric shaft.

10. A power actuated tong for drilling rigs, which tong comprises;
(a) a pair of tong bodies,
    (1) linkage means pivotally supporting said tong bodies intermediate the ends thereof for lateral swinging movement within a plane,
    (2) each tong body being mounted for movement in a different horizontal plane,
(b) a jaw pivotally mounted on each tong body near the distal end thereof,
    (1) said jaws extending toward each other to form an opening between the jaw and the body of the respective tongs,
(c) pipe engaging means on each tong body, within said opening,
(d) a further pipe engaging means disposed on each tong body opposite said opening in each pivotally mounted jaw,
(e) a first fluid actuated cylinder operatively mounted on each said tong body,
(f) a plunger extending outward from each fluid actuated cylinder,
    (1) means on each said plunger to complementally engage each said movable jaw, to move said jaws into gripping engagement with said pipe when said plunger is in one position,
(g) means interconnected between each movable jaw and the respective tong body to move said jaw into another position, when said plunger is in a second position,
(h) a second pair of fluid actuated cylinders, one mounted on each tong body,
    (1) each said second cylinder having plunger therein, which plunger is connected to the respective linkages pivotally mounting said tong bodies to move each tong body laterally within the respective planes,
    (2) said tong bodies each being movable in a different horizontal plane,
(i) a third fluid actuated cylinder connected to the end of one tong body opposite said movable jaw thereof,
    (1) said third fluid actuated cylinder being pivotally connected to said tong body to move said tong body through an arc, with the axis of the pipe being the axis of the arc, and
(j) means maintaining said tong bodies in aligned relation for movement into the pipe for engagement therewith, and to move said tong bodies off said pipe when in disengaged position.

11. A wrenching assembly for power tongs comprising;
(a) a wheeled carriage,
(b) a first fluid cylinder operatively associated with said wheeled carriage, and being connected thereto for movement of said wheeled carriage along a horizontal path, (c) a second fluid cylinder mounted on said wheeled carriage and extending vertically upward therefrom,
   (1) a support standard extending upward above the upper end of said second cylinder,
   (2) a frame mounted on said support standard on said second fluid cylinder and extending outwardly therefrom and forwardly thereof,
   (3) a pair of extending arms pivotally mounted on the distal end of said frame,
(d) a tong associated with each arm, each tong being movable in a separate horizontal plane,
   (1) each tong having an open side, which open sides are in facing relation to each other,
   (2) a fluid actuated third cylinder pivotally mounted on each tong of said pair of tongs,
   (3) a plunger within each said fluid actuated third cylinder,
   (4) a cam operatively associated with the plunger of each said fluid actuated third cylinder,
   (5) a pipe gripping jaw mounted on the body of each tong of said pair of tongs,
   (6) a complementary, movable jaw mounted on the body of each tong of said pair of tongs,
   (7) a toothed pipe engaging means in each said movable jaw,
   (8) a toothed pipe engaging means in the body of each said tong and being in complementary relation with said pipe engaging means in the respective movable jaws, and
   (9) means cooperatively associated with the respective movable jaws for complementary engagement with the respective cams, when said cams are in one position.

12. A wenching assembly for power tongs, as defined in claim 11; wherein
   (a) two frames are mounted on said support standard on said second fluid actuated cylinder, and wherein
   (b) said frames diverge outwardly from said support standard.

13. A wrenching assembly for power tongs, as defined in claim 11; wherein
   (a) a second upright standard is mounted on said wheeled frame,
   (b) an outwardly extending first arm is connected to said first upright standard, which first arm extends outwardly toward said second upright standard,
   (c) a pair of arms pivotally mounted on said outwardly extending first arm,
      (1) a roller on each pivotally mounted arm, which rollers are engageable with said second upright standard to guide said first upright standard in parallel, stabilized relation to said second upright standard.

14. A wrenching assembly for power tongs as defined in claim 13; wherein
   (a) means is provided whereby said arms mounting said rollers may be adjusted laterally with respect to said second upright standard,
   (b) screw bolt means is provided to adjust said rollers into rolling contact with said second upright standard.

15. A wrenching assembly for a power tong as defined in claim 13; wherein
   (a) a fluid actuated cylinder lies adjacent each said tong body and is pivotally mounted thereon to swing said respective tong bodies into engaging and out of engaging position with respect to the pipe.

No references cited.

JAMES L. JONES, JR., *Primary Examiner.*